United States Patent [19]

Fieldhouse

[11] 4,175,113
[45] Nov. 20, 1979

[54] PURIFICATION OF CRUDE CHLOROPHOSPHAZENE COMPOUNDS BY TREATMENT WITH WATER

[75] Inventor: John W. Fieldhouse, Mogadore, Ohio

[73] Assignee: The Firestone Tire & Rubber Company, Akron, Ohio

[21] Appl. No.: 897,993

[22] Filed: Apr. 20, 1978

[51] Int. Cl.$^2$ .............................................. C01B 25/10
[52] U.S. Cl. ................................................... 423/300
[58] Field of Search ........................................ 423/300

[56] References Cited

U.S. PATENT DOCUMENTS

| | | | |
|---|---|---|---|
| 3,694,171 | 9/1972 | Dreifus | 423/300 |
| 3,952,086 | 4/1976 | Fieldhouse | 423/300 |

*Primary Examiner*—O. R. Vertiz
*Assistant Examiner*—Wayne A. Langel

[57] ABSTRACT

A process for the purification of crude chlorophosphazene involves the use of an intermediate purification stage in which the crude chlorophosphazene is subjected to at least two water-washings, following which a final purification step is conducted utilizing a conventional chlorophosphazene purification procedure, such as recrystallization, sublimation, distillation, or melt-filtering and at least a very high purity cyclic chlorophosphazene trimer is then recovered. In a preferred process, the crude chlorophosphazene is subjected to three water-washings prior to the final purification step.

5 Claims, No Drawings

PURIFICATION OF CRUDE CHLOROPHOSPHAZENE COMPOUNDS BY TREATMENT WITH WATER

BACKGROUND OF THE INVENTION

The present invention relates to a process for the purification of crude chlorophosphazene. More particularly, the present invention relates to a chlorophosphazene purification process involving an intermediate purification or partial purification stage in which the crude chlorophosphazene is subjected to at least two water-washings, following which a final purification step is performed by a conventional chlorophosphazene purification procedure, such as recrystallization, distillation, sublimation or melt-filtering and a substantially purified chlorophosphazene is recovered.

Heretofore, in the production of chlorophosphazenes or phosphonitrilic chlorides, purity of the compounds generally was not a factor since their specific uses such as for flame retardants and thermally resistant resins did not require removal of contaminates. Generally, chlorophosphazenes $(NPCl_2)_x$ where x equals 3 through 9 are largely produced by the reaction of phosphorus pentachloride and ammonium chloride which results in compounds, that is, $x=3-9$, having a high degree of impurities. Although several methods of purification are available, a good degree of purification to date has been difficult to achieve. Thus, chlorophosphazenes which are contaminated with impurities, upon heating in excess of 250° C. will often result in gelled polymers which are benzene insoluble.

The general approach of prior art methods of purification has been the separation of isomers of chlorophosphazene, either by utilization of the differences of boiling points of the isomers or by the different reactivities of the isomers with aqueous bases. Specific purification methods have involved the extraction of chlorophosphazene from petroleum ether solutions with sulfuric acid, U.S. Pat. No. 3,008,799; controlled crystallizaton in a variety of solvents, U.S. Pat. No. 3,378,353; separation of the trimer and tetramer from the produced mixtures through distillation involving a spinning band column, U.S. Pat. No. 3,379,510; contacting molten chlorophosphazenes with an inert solvent vapor so as to selectively vaporize the cyclic trimer, separating a solvent vapor phase laden with trimer and some tetramer from the molten residue, condensing it to form a solution of trimer and tetramer in the solvent and subsequently recovering trimer together with some tetramer from the solution; U.S. Pat. No. 3,677,720; steam distillation of chlorophosphazenes resulting in hydrolysis of $x=4-9$ and hence separation of the trimer, Chemical Abstracts, Volume 77, Page 540, 159648D (1972); saponification and hydrolysis of chlorophosphazenes by treatment with aqueous sodium or ammonium hydroxide resulting in unreacted trimer and tetramer, U.S. Pat. No. 3,694,171; and, contacting a crude chlorophosphazene with a Bronsted base, removing water formed from the reaction of the Bronsted base with the impurities in the chlorophosphazene, and then recovering at least a very high purity cyclic chlorophosphazene trimer, U.S. Pat. No. 3,952,086.

As a general rule, prior art methods of purification have avoided the use of water in the purification of crude chlorophosphazenes in view of the well known instability of such chlorophosphazenes toward protonic molecules such as water, methanol, ethanol, isopropanol, alkyl amines and other basic materials. Thus, the use of these protonic materials including water, has been generally avoided in the prior art methods of purification since these materials often cause displacement or replacement of the covalent and/or ionic chloride atoms on the phosphorus atoms of the chlorophosphazene and lead to attendent problems in polymerization and derivatization of the chlorophosphazene.

Of the prior art methods of purification listed above, the chemical abstracts article which employs steam distillation and U.S. Pat. No. 3,694,171 which employs aqueous sodium or ammonium hydroxide in the purification process appear to represent departures from the general rule. However, the purification processes disclosed in these references have been found to suffer from very serious disadvantages which virtually eliminates or at least materially limits their usefulness. Thus, it has been found that neither of the processes disclosed in the aforementioned references provide for the production of chlorophosphazenes of sufficient purity to permit the preparation of polydichlorophosphazene polymers without also producing appreciable amounts of gel.

SUMMARY OF THE INVENTION

In accordance with the present invention, an improved process for purifying crude cyclic chlorophosphazenes has been developed which substantially reduces or eliminates many of the disadvantages of the prior art purification processes. Thus, the purification process of this invention results in the production of cyclic chlorophosphazene trimers and tetramers having sufficiently high degree of purity that polymers produced therefrom exhibit less color, very little gel, and desirable viscosity characteristics. In addition, the process of the invention obviates the necessity for utilizing two complex purification steps such as recrystallization and distillation.

The present process involves subjecting the crude cyclic chlorophosphazene to at least two water-washings at room temperature following which the chlorophosphazene is recovered, dried and then further purified by recrystallization, distillation, sublimation or melting and filtering.

DETAILED DESCRIPTION OF THE INVENTION

In the process of this invention, crude chlorophosphazenes are highly purified by a procedure which involves an intermediate purification step of washing the crude material at least twice with water to effect at least partial removal of impurities, following which the chlorophosphazene is subjected to a final purification by recrystallization, distillation, sublimation or melt-filtering to effect substantial removal of the remaining impurities. In this invention, the impurities contaminating the crude chlorophosphazene, thought to be acidic in nature, can be at least partially removed with water since it is believed that under the conditions employed, the water reacts with the acid impurities, but does not effect the phosphorus-chlorine bond of the chlorophosphazene.

Crude chlorophosphazenes or phosphonitrilic chlorides can be obtained by conventional processes such as the reaction of the phosphorus pentachloride and ammonium chloride whereby $(NPCl_2)_x$ cyclic compounds are produced wherein x is an integer of 3 through 9.

Depending, of course, upon the particular mode, manner and variables as well known to one skilled in the art, the amounts of various cyclic chlorophosphazene compounds produced will vary. However, generally a substantial amount of cyclic trimer (about 60 percent) can be produced along with a fair amount of cyclic tetramer (about 20 percent) with the remainder being cyclic compounds where x=5-9.

It should be noted at this time that the efficiency of the process of this invention is dependent to some degree on the specific nature of the crude chlorophosphazene material which is to be purified. Thus, in most instances, the crude chlorophosphazene material to be purified contains only relatively minor amounts of high molecular weight species, and in that case, the instant process is quite effective. However, in certain isolated instances, the crude chlorophosphazene material may contain substantial quantities of high molecular weight or polymeric species. In this latter case, the instant process is considerably less effective and it may, therefore, be desirable to employ a more conventional purification process.

The first stage in the purification process of the present invention involves washing the crude chlorophosphazene with water at least twice and preferably three times. This is accomplished by placing the crude chlorophosphazene in a suitable vessel, container, or pot which is equipped with a mechanical stirring means and then adding the water thereto. The mixture of crude chlorophosphazene is then stirred vigorously for a period of time at room temperature (i.e. 20°-25° C.) and the water is then removed from the vessel. The washing procedure is then repeated at least once and preferably twice more with the water being removed from the vessel after each washing.

The amount of water employed in each water washing step can vary considerably depending on factors such as the amount of crude chlorophosphazene material to be purified, the amount of impurities in the crude, and the like. In general, amounts of water ranging from about twice to about three times by weight based on the weights of crude chlorophosphazene can be employed.

The length of time involved in each water-washing treatment can also vary considerably depending on factors such as the amount of crude chlorophosphazene to be purified, the amount of impurities in the crude, the degree of agitation and the like. In general, each water washing procedure may involve times ranging from about 1 hour to about 20 hours or more.

While water alone can be used during the water washing treatment, it is usually preferred to include a surfactant in the procedure. The use of a surfactant is advantageous in that it enables the production of a stable dispersion of the crude polyphosphazene particles in water and, thereby, improves the efficiency of the water washing procedure. When a surfactant is employed in the water washing stage of the process, it should be one which is non-ionic in character.

Virtually any of the non-ionic surfactants conventionally employed in the polymer dispersion or emulsion arts may be employed in the water-washing stage. Thus, non-ionic surfactants which may suitably be employed include, among others, block copolymers of ethylene oxide and propylene oxide comprising a hydrophilic propylene oxide section combined with one or more hydrophilic ethylene oxide sections; alkylphenoxypolyethoxyethanols having alkyl groups of about 7 to 18 carbon atoms and 6 to 60 or more of ethylene units, such as octylphenoxypolyethoxyethanols, nonylphenoxypolyethoxyethanols and the like; and ethylene oxide derivatives of etherified or esterified polyhydroxy compounds having a hydrophilic hydrocarbon chain such as soritan monostearate containing 6 to 60 oxyethylene units. The preferred non-ionic surfactants for use in the water washing procedure of the present invention are the above mentioned block copolymers of ethylene oxide and propylene oxide. Particularly preferred block copolymers of this type are those which are commercially available under the designation PLURONIC® from the BASF Wyandotte Corporation.

As mentioned heretofore, following each water-washing treatment, the water is removed from the vessel or container in which the crude chlorophosphazene is located. This can be accomplished by any convenient method. Thus, the water can be removed by simple decantation from the solid chlorophosphazene phase, filtering, or by vacuum filtering. In general, it is preferred to remove the water in the initial water treatments by decantation or filtering, following which the final removal is accomplished by vacuum filtering at room temperature (i.e. 20°-25° C.).

In general, the desired vacuum to remove the water can vary over a wide range, that is from a slight or partial vacuum to a very high vacuum. A vacuum of approximately 0.5 to approximately 30 millimeters of mercury has been found to produce good results without removing a substantial amount of the crude. The water removed in the vacuum procedure can be collected in any conventional manner such as in cold traps outside of the vessel. The total vacuum time will vary depending on the amount of water to be removed and on the amount of impurities in the crude, but will usually be complete in 30 to 90 minutes.

Following the vacuum filtering procedure, the crude chlorophosphazene in the form of a crystalline solid is then dried under vacuum at room temperature. The drying time will vary considerably depending on the amount of water remaining in the crude. In general, the time can range from about 4 to about 24 hours.

As mentioned heretofore, following the drying procedure, the partially purified chlorophosphazene is then subjected to a final purification by a conventional procedure such as distillation, recrystallization, sublimation or melting and filtering. Thus, the final purification step can be performed by a distillation procedure such as that described in U.S. Pat. Nos. 3,379,510 or 3,829,544; a recrystallization procedure such as that described in U.S. Pat. No. 3,378,353 or a sublimation procedure such as that described in Canadian patent 965,928 or the article entitled: "Phosphorus-Nitrogen Compounds" by H. R. Allcock pages 309-310 (Academic Press); the disclosures of all of which are hereby incorporated herein by reference. Additionally, a melting and filtering procedure can be employed in which the chlorophosphazene is heated to a temperature above the melting point of the $(NPCl_2)_3$ trimer (i.e. melting point approximately 115° C.) and the molten chlorophosphazene is then filtered by, for example, gravity filtration.

The final criteria for purity of the chlorophosphazene purified by the process of this invention is the efficiency of polymerization. Thus, a chlorophosphazene having an acceptable degree of purity is one in which the material can be polymerized without producing a substantial quantity of gel and in which the color of the polymerizate is not exceptionally dark. It should be noted here that in general the purer the chlorophosphazene is the slower it polymerizes. Thus, the impure chlorophosphazene usually polymerizes rather rapidly, but the resultant polymerizate often contains objectionable amounts of gel which makes it extremely difficult if not impossible to derivatize the polymer. Accordingly, in most instances the pure chlorophosphazene often requires the use of a catalyst in the polymerization process. Nevertheless, polyphosphazene polymers prepared from highly purified chlorophosphazenes exhibit much improved properties, contain much less gel and are, therefore, more readily derivatized.

The following examples are submitted for the purpose of further illustrating the nature of the present invention, and should not be interpreted as a limitation on the scope thereof. Unless otherwise indicated, the parts and percentages shown in the Examples are by weight.

The following example illustrates the partial purification of a crude chlorophosphazene utilizing the water-washing procedure of the invention.

EXAMPLES 2–8

As indicated heretofore, samples of chlorophosphazene partially purified by water treatment in accordance with the procedure set forth in Example 1 were subjected to a final purification by distillation, recrystallization, sublimation and melt-filtering respectively, (i.e. Examples 2–8). The control samples (i.e. Examples A & B) were obtained from the original crude chlorophosphazene and were completely purified by distillation and recrystallization respectively. The purified materials were then polymerized and evaluated for properties with the purity of the chlorophosphazene being principally indicated by the properties of the polymerizate. Of these properties, the viscosity (i.e. dilute solution viscosity) % gel, and color are particularly important. Thus, chlorophosphazenes having a high degree of purity generally exhibit relatively low DSV, minor proportions of gel (i.e. less than 5.0%) and light colors. Test results in these examples are shown in the Table.

TABLE 1

| Ex. No. | Initial Purification | Final Purification | Polymerization @ 270° C./hrs. | Catalyst | % Conversion | % DSV | % Gel | Color |
|---|---|---|---|---|---|---|---|---|
| A (Control) | None | Distillation[1] | 8.2 | none | 54.7 | Highly gelled | | dark amber |
| B (Control) | None | Recrystallization[2] | 1.7 | none | 63.7 | highly gelled | | dark amber |
| 2 | Ex. 1 | Distillation[1] | 25 | none | 37.0 | 0.96 | 2.3 | pale yellow |
| 3 | Ex. 1 | Distillation[1] | 25 | none | 37.0 | 0.96 | 0.0 | pale yellow |
| 4 | Ex. 1 | Distillation[1] | 30 | none | 35.5 | 1.41 | 0.24 | colorless |
| 5 | Ex. 1 | Distillation[1] | 7 | $CrCl_3 \times H_2O$ | 31.5 | 1.47 | 0.18 | colorless |
| 6 | Ex. 1 | Melted & Filtered[3] | 24 | none | 31.0 | 1.16 | 0.89 | pale yellow |
| 7 | Ex. 1 | Sublimed[4] | 20 | none | 31.0 | 1.20 | 0.0 | pale yellow |
| 8 | Ex. 1 | Recrystallization[2] | 3.5 | none | 26.0 | 2.06 | 0.09 | colorless |

[1] performed substantially in accordance with the procedure set forth in U.S. Pat. No. 3,379,510 or 3,829,554
[2] performed substantially in accordance with the procedure set forth in U.S. Pat. No. 3,378,353
[3] performed as described in the specification above
[4] performed substantially in accordance with the procedure set forth in "Phosphorus-Nitrogen Compounds", H. R. Allcock, pages 309–310 (Academic Press)

EXAMPLE I

Into a five (5) liter flask equipped with a mechanical stirring means and a vacuum source was charged 578.0 grams of crude $(NPCl_2)_n$, wherein n=3 to 9. Then 1500.0 grams of water and 1.45 grams of Pluronic® F-127 (a non-ionic surfactant consisting of a polyethylene oxidepropylene oxide copolymer available from BASF Wyandotte Corporation) were charged to the flask. The resultant dispersion was stirred vigorously for 2 hours at 20°–25° C. The aqueous phase of the dispersion was then decanted from the solid phase and replaced with 1500.0 grams of fresh water. The resultant dispersion was then stirred vigorously for 18 hours at 20°–25° C. and filtered through a fiber glass filter. The solid phase was then washed with 1500.0 grams of fresh water and sucked on a vacuum filter for 1 hour. The crystalline solid was then dried at 20°–25° C. for 20 hours at 0.5 millimeters of mercury. The drying procedure resulted in the production of 367.0 grams (63.5%) of solid material. The solid material was analyzed by gas chromatography and found to contain 60% of $(NPCl_2)_3$ and 40% of $(NPCl_2)_4$.

The following Examples (i.e. 2–8) illustrate the final purification of chlorophosphazenes utilizing distillation, recrystallization, sublimation or melt-filtering. In these examples, samples of the material partially purified by the procedure of Example 1 were subject to final purification by one of the above methods. In order to compare, the purification process of the invention with conventional chlorophosphazene processes, two control samples (i.e. Examples A & B) were completely purified using distillation (Example A) and recrystallization (Example B).

As the data in the Table illustrates, the control examples which were purified by conventional distillation and recrystallization techniques, when polymerized produced darkly colored polymerizates having a high degree of gel, whereas the examples of the invention which were initially purified by water treatment and then subjected to a final purification by distillation, recrystallization, sublimation, or melting and filtering, when polymerized produced lightly colored polymerizates having a very low degree of gel and excellent viscosity characterisitics.

I claim:

1. A process for the purification of crude chlorophosphazene which comprises the steps in sequence of:
   (a) subjecting the crude chlorophosphazene to at least two water-washings performed at room temperature and under agitation, wherein following each water-washing the water is removed from the chlorophosphazene;
   (b) drying the chlorophosphazene under vacuum at room temperature; and
   (c) subjecting the chlorophosphazene to a final purification by distillation, recrystallization, sublimation or melting and filtering.

2. The process of claim 1 wherein the water-washing is conducted in the presence of a non-ionic surfactant.

3. The process of claim 2 wherein said non-ionic surfactant is a polyethylene oxide—polypropylene oxide copolymer.

4. The process of claim 1 wherein the crude chlorophosphazene is subjected to three water-washings in step (a).

5. The process of claim 1 wherein the chlorophosphazene is dried under a vacuum of 0.5 millimeters of mercury.

* * * * *